US007149360B2

(12) United States Patent
Brake et al.

(10) Patent No.: US 7,149,360 B2
(45) Date of Patent: Dec. 12, 2006

(54) METHOD FOR USING A JPEG ENGINE TO ASSIST IN EFFICIENTLY CONSTRUCTING MPEG I-FRAMES

(75) Inventors: Wilfred F Brake, Fort Collins, CO (US); Michelle Ogg, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 702 days.

(21) Appl. No.: 10/043,950

(22) Filed: Jan. 9, 2002

(65) Prior Publication Data

US 2003/0179937 A1     Sep. 25, 2003

(51) Int. Cl.
*G06K 9/36*     (2006.01)

(52) U.S. Cl. .................... 382/232; 382/248; 382/250

(58) Field of Classification Search ............ 382/232, 382/236, 238, 244, 246, 303, 233, 250, 248; 715/723, 722, 441; 348/722, 441; 375/240.25, 375/240.03; 341/65, 106, 108; 712/300, 712/2, 200, 220; 386/107, 117; 710/68, 710/7

See application file for complete search history.

(56) References Cited

U.S. PATENT DOCUMENTS 5,784,631 A * 7/1998 Wise ...................... 382/246
6,052,555 A * 4/2000 Ferguson ................. 725/116
6,058,210 A * 5/2000 de Queiroz et al. ........ 382/232
6,320,600 B1 * 11/2001 Smith et al. ............... 715/723
6,332,003 B1 * 12/2001 Matsuura et al. ...... 375/240.23
6,370,273 B1 * 4/2002 Kuo ......................... 382/233
6,373,412 B1 * 4/2002 Mitchell et al. ............ 341/65
6,445,823 B1 * 9/2002 Liang ....................... 382/232
6,629,101 B1 * 9/2003 Enokida ................... 707/102
6,690,881 B1 * 2/2004 Tomita et al. ............. 386/117
6,757,439 B1   6/2004 Leeder ...................... 382/246
6,816,550 B1 * 11/2004 Kumaki ................ 375/240.03

OTHER PUBLICATIONS

Zhong et al., "Automatic Caption Localization in Compressed Video", IEEE Transactions on Pattern Analysis and Machine Intelligence, vol. 22, No. 4, Apr. 2000, pp. 385-392.*
Ozer et al., "Human Detection in CVompressed Domain", IEEE International Conference on Image Processing, vol. 3, Oct. 2001, pp. 274-277.*

* cited by examiner

*Primary Examiner*—Anh Hong Do (57) ABSTRACT

A camera or other imaging device or other system configures its JPEG engine to produce a JPEG image that is in compliance with the JPEG specification but specially constructed. The configuration is chosen such that the JPEG image information for pixels of an image is stored in 8- or 16-bit groups, unlike a typical JPEG image in which image information is stored in groups of varying numbers of bits. A final software step reads the JPEG image information and constructs an equivalent MPEG I-frame. The 8- and 16-bit grouping in the JPEG image facilitates efficient conversion from JPEG to MPEG.

8 Claims, 2 Drawing Sheets

METHOD FOR USING A JPEG ENGINE TO ASSIST IN EFFICIENTLY CONSTRUCTING MPEG I-FRAMES

FIELD OF THE INVENTION

The present invention relates generally to digital image compression.

BACKGROUND OF THE INVENTION

Several techniques exist for compressing digital image files. Compression is done in order to reduce the resource requirements for storing and transmitting image files. Lossless compression techniques exploit statistical characteristics of the image data to code the files more efficiently, and allow exact reconstruction of the original data. "Lossy" compression techniques use similar statistical methods, and also tolerate small changes in the content of the files after compression and reconstruction. Lossy techniques typically produce compressed files considerably smaller than files produced by lossless techniques, and in some applications, the changes in content are negligible.

One commonly used lossy compression technique is the JPEG technique, named for the Joint Photographic Experts Group, the committee that developed the specifications for standard use of the technique and for the standard file format of JPEG image files. The JPEG technique is especially useful for images of natural scenes, and is widely used for compressing digital photographs. Many digital still cameras include circuitry that implements the JPEG standard to create compressed files.

Some digital cameras provide the ability to capture moving pictures as well as still images. Moving pictures may be thought of as sequences of still images. To facilitate the compression of moving pictures, another standard, called MPEG, has been developed by the Moving Picture Experts Group. There are several variants of MPEG compression, but the features described in this specification are common to all, so all the variants will be referred to here generically as MPEG.

In a simple implementation of MPEG, a moving picture sequence comprises a series of individually compressed still images called "I-frames". An MPEG I-frame is intra-coded, that is, compressed without regard to the content of frames occurring before or after it in the sequence. The MPEG technique allows, but does not require, other kinds of frames, for example "P-frames" and "B-frames", that do take into account the content of adjoining frames. The present invention addresses the generation of I-frames.

Some of the processing necessary to construct an MPEG I-frame is identical to some of the processing used to construct a JPEG compressed image. However, a finishing step is significantly different between the two techniques.

The circuitry or other engine used in cameras to construct JPEG images is often configurable in order to allow the compression to be optimized for particular data, and some flexibility is allowed within the JPEG specification. However, it is not possible to construct a completed MPEG I-frame using a standard JPEG engine or circuitry.

A brief and simplified example will aid in providing an overview of the steps involved in JPEG and MPEG compression.

An MPEG I-frame has many similarities to a still image compressed using the JPEG technique. The sequence of steps required for generating either a JPEG image or an MPEG I-frame includes:

0. Color space conversion
1. Downsampling, also called subsampling or decimation
2. Constructing macroblocks
3. Performing a Discrete Cosine Transform (DCT)
4. Quantization
5. "Zig zag" ordering of the quantized coefficients
6. Differential coding of the DC coefficient from the DCT
7. Run-length coding of the AC coefficients from the DCT
8. Variable-length coding of the coefficients from the DCT All of these steps except the last may be performed identically whether the desired result is a JPEG image or an MPEG I-frame. However, the final step of variable-length coding the coefficients is significantly different for constructing an MPEG I-frame than for constructing a JPEG image.

A digital camera produces an ordered array of data representing an original scene. Each location in the scene is represented by a corresponding picture element, or "pixel". The data describing each pixel indicate the brightness and color of the original scene at the location corresponding to the pixel. The brightness and color are often represented by numerical values indicating the strengths of red, green, and blue light sensed from the scene location. An image of this type is often said to be in "RGB" format. Other representations of brightness and color may be used, and conversions from one system of representation, or "color space", to another are readily accomplished.

Both JPEG and MPEG require the image to be represented in the color space known as YCrCb. In the YCrCb color space, a pixel is described by its overall brightness or luminance, (Y) and two chrominance values (Cr and Cb) that describe the color of the pixel. The color space conversion step of JPEG or MPEG compression involves converting from another color space such as RGB to YCrCb.

Many cameras use electronic array sensors that have many more pixels than are typically used in moving picture frames. Often, cameras provide the ability to save images at various resolutions. The lower the resolution, the fewer pixels used to represent the image and the less detail will be visible in the image file. The conversion from a higher resolution image to a lower resolution image is often called downsampling, subsampling, or decimation.

Additionally, the MPEG specification requires and the JPEG specification allows the chrominance channels of the image to be further downsampled in the 4:2:0 video format. In this format, the chrominance channels are downsampled to half the linear resolution of the luminance channel in each of the two orthogonal coordinate directions of the image. Thus each chrominance channel represents the image with one fourth as many pixels as does the luminance channel, and at a correspondingly lower resolution. Chrominance downsampling takes advantage of the human visual system's decreased sensitivity to resolution in the chrominance channels in comparison with the luminance channel to reduce the data required to represent a pleasing image.

Once the image is downsampled, it is divided into "macroblocks". A macroblock consists of a 16-pixel by 16-pixel sample array of luminance samples together with one 8-sample by 8-sample block from each of the chrominance channels. The sample array of luminance samples may be thought of as four subarrays that are each eight pixels square. Images that are not a multiple of 16 pixels wide or tall are padded with blank pixels so that complete macroblocks may be constructed. The next step in the process uses the data in arrays of numbers eight elements square. The division of the image into macroblocks may be entirely conceptual, as the data in the memory of the camera, imaging device, or system need not be rearranged to accomplish the division.

Identifying the macroblocks partitions all of the image data, both luminance and chrominance, into arrays that are eight elements square. For example, an array of luminance samples may be as follows:

| 102 | 100 | 101 | 101 | 104 | 104 | 122 | 137 | (1) |
|---|---|---|---|---|---|---|---|---|
| 102 | 100 | 100 | 101 | 104 | 108 | 121 | 132 | |
| 104 | 102 | 101 | 101 | 105 | 106 | 123 | 135 | |
| 107 | 105 | 103 | 99  | 107 | 109 | 123 | 134 | |
| 110 | 105 | 104 | 104 | 109 | 110 | 126 | 138 | |
| 112 | 109 | 107 | 97  | 111 | 113 | 129 | 139 | |
| 114 | 102 | 113 | 112 | 122 | 121 | 136 | 153 | |
| 124 | 118 | 124 | 124 | 140 | 151 | 164 | 181 | |

(1)

This example array of luminance data will be used below to illustrate the following steps, and to describe an embodiment of the invention. One of ordinary skill in the art will recognize that the steps and the embodiment of the invention apply to both luminance and chrominance data, and that no loss of generality is intended or created by using a single example array.

For each 8×8 array in the image, a two-dimensional discrete cosine transform (DCT) is performed. The DCT is described in *MPEG Video Compression Standard*, edited by Joan L. Mitchell, William B. Pennebaker, Chad E. Fogg, and Didier J. LeGall, and published by Chapman & Hall, ISBN 0-412-08771-5. The DCT of the example array above is:

| 928.12 | −86.29 | 53.66 | −15.12 | 13.12  | −3.35  | 1.18   | 11.27  | (2) |
|---|---|---|---|---|---|---|---|---|
| −64.23 | 18.27  | −2.00 | −5.23  | −1.06  | 1.39   | −5.46  | −4.22  | |
| 36.50  | −18.85 | −1.66 | −1.36  | 2.67   | .89    | 3.53   | −.37   | |
| −25.06 | 11.06  | 1.78  | −1.51  | .19    | −.14   | −1.19  | 2.27   | |
| 19.38  | −6.59  | 1.41  | .14    | −.13   | −.72   | −.18   | −1.64  | |
| −11.01 | 3.31   | −.84  | −2.72  | 2.88   | .39    | .76    | 2.63   | |
| 6.12   | −1.25  | 4.78  | .60    | −3.68  | −2.55  | −1.84  | .77    | |
| −1.07  | −1.29  | −1.92 | −3.46  | 5.36   | 3.18   | −.24   | −.65   | |

The upper left DCT coefficient indicates a scaled average value of the input data array. In general, the other coefficients represent the spatial frequency content of the image, with higher frequency components at the lower right of the array.

The next step in both JPEG and MPEG compression is to "quantize" the array. Quantization is performed by an element-by-element division by another array of quantizing values, and rounding the results. An example array of quantizing values is:

| 8  | 16 | 19 | 22 | 26 | 27 | 29 | 34 | (3) |
|---|---|---|---|---|---|---|---|---|
| 16 | 16 | 22 | 24 | 27 | 29 | 34 | 37 | |
| 19 | 22 | 26 | 27 | 29 | 34 | 34 | 38 | |
| 22 | 22 | 26 | 27 | 29 | 34 | 37 | 40 | |
| 22 | 26 | 27 | 29 | 32 | 35 | 40 | 48 | |
| 26 | 27 | 29 | 32 | 35 | 40 | 48 | 58 | |
| 26 | 27 | 29 | 34 | 38 | 46 | 56 | 69 | |
| 27 | 29 | 35 | 38 | 46 | 56 | 69 | 83 | |

Using array (3) to quantize the array (2) of DCT coefficients above gives these quantized coefficients:

| 116 | −5 | 2 | 0 | 0 | 0 | 0 | 0 | (4) |
|---|---|---|---|---|---|---|---|---|
| −4  | 1  | 0 | 0 | 0 | 0 | 0 | 0 | |
| 1   | 0  | 0 | 0 | 0 | 0 | 0 | 0 | |
| −1  | 0  | 0 | 0 | 0 | 0 | 0 | 0 | |
| 0   | 0  | 0 | 0 | 0 | 0 | 0 | 0 | |
| 0   | 0  | 0 | 0 | 0 | 0 | 0 | 0 | |
| 0   | 0  | 0 | 0 | 0 | 0 | 0 | 0 | |
| 0   | 0  | 0 | 0 | 0 | 0 | 0 | 0 | |

After the quantization, the coefficients are placed in a "zig zag" order. The order of reading out the coefficients is illustrated below:

| 1  | 2  | 6  | 7  | 15 | 16 | 28 | 29 | (5) |
|---|---|---|---|---|---|---|---|---|
| 3  | 5  | 8  | 14 | 17 | 27 | 30 | 43 | |
| 4  | 9  | 13 | 18 | 26 | 31 | 42 | 44 | |
| 10 | 12 | 19 | 25 | 32 | 41 | 45 | 54 | |
| 11 | 20 | 24 | 33 | 40 | 46 | 53 | 55 | |
| 21 | 23 | 34 | 39 | 47 | 52 | 56 | 61 | |
| 22 | 35 | 38 | 48 | 51 | 57 | 60 | 62 | |
| 36 | 37 | 49 | 50 | 58 | 59 | 63 | 64 | |

Because coefficients in the lower right part of the array are likely to be zero after quantization, the zig zag ordering tends to maximize runs of zeros in the ordered list. The coefficients of the example array in zig zag order are:

116 −5 −4 1 1 2 0 0 0 −1 0 0 0 . . . (50 more zeros)

The first coefficient in this list represents a scaled average value for the pixels in the 8×8 block. This is often called the "DC" coefficient. The other coefficients are called "AC" coefficients. In both JPEG and MPEG, the DC coefficient for each block is differentially coded. That is, rather than store the coefficient itself, the difference between the coefficient from the previous block and the present coefficient is stored. Because the DC coefficients tend to change slowly, this differential coding tends to allow the storage of smaller numbers, thereby conserving storage space. In this example, it is assumed that the previous pixel block had a DC coefficient after quantization of 120, resulting in a difference of −4. The coefficients can be further arranged as follows:

TABLE 1

| Coefficient Number | Preceding run of zeros | Value |
|---|---|---|
| 0 (DC) | N/A | −4 |
| 1 | 0 | −5 |
| 2 | 0 | −4 |
| 3 | 0 | 1 |
| 4 | 0 | 1 |
| 5 | 0 | 2 |
| 9 | 3 | −1 |
| End of Block | | |

The final step in compressing a block of pixels is to encode this information using variable length coding, which is often called Huffman coding. In Huffman coding, common patterns in data are assigned short sequences of bits, while less common patterns are assigned longer sequences. The sequences are chosen so that they cannot be confused with each other. In this way, data that have a nonuniform distribution of pattern frequencies can be stored losslessly in a smaller form.

In both JPEG and MPEG, different codes are used for the DC and AC coefficients. In JPEG, different codes may be used for the luminance channel and the chrominance channels.

MPEG specifies the table of Huffman codes for the quantized DCT coefficients. JPEG allows the user to select a set of Huffman codes. It is possible to select the JPEG codes for the DC coefficient to match the MPEG specification. However, the coding schemes are significantly different between JPEG and MPEG for the AC coefficients, and it is not possible to configure a JPEG engine to generate the Huffman code stream of an MPEG file.

The Huffman codes for the DC coefficient of the luminance channel for an MPEG file and a typical JPEG file are selected according to the following table:

TABLE 2

| Y code | size | magnitude range |
|---|---|---|
| 100 | 0 | 0 |
| 00 | 1 | −1, 1 |
| 01 | 2 | −3 . . . −2, 2 . . . 3 |
| 101 | 3 | −7 . . . −4, 4 . . . 7 |
| 110 | 4 | −15 . . . −8, 8 . . . 15 |
| 1110 | 5 | −31 . . . −16, 16 . . . 31 |
| 11110 | 6 | −63 . . . −32, 32 . . . 63 |
| 111110 | 7 | −127 . . . −64, 64 . . . 127 |
| 1111110 | 8 | −255 . . . −128, 128 . . . 255 |

In this table, the Y code is a bit pattern that identifies the size range of a particular DC coefficient. The "size" entry indicates the number of bits that follow the Y code to indicate the exact value of the coefficient. The magnitude range indicates the values represented by various bit patterns. In the example from above, the value to be encoded is −4. The fourth line in the table encompasses a value of −4, so the Y code bit pattern to be used is 101. The table indicates that a three-bit value follows this Y code. There are eight possible patterns of three bits, and there are eight values in the table that correspond to the eight patterns— −7, −6, −5, −4, 4, 5, 6, and 7. The bit patterns corresponding to these values are as follows:

TABLE 3

| Bit pattern | value |
|---|---|
| 000 | −7 |
| 001 | −6 |
| 010 | −5 |
| 011 | −4 |
| 100 | 4 |
| 101 | 5 |
| 110 | 6 |

The bit pattern column in this table is simply the possible bit patterns in ascending order, and the corresponding values are the possible values in ascending order. Similar tables can be constructed for other lines in Table 2. From Table 3, the following bit pattern for a value of −4 is 011. The value stored in the file to indicate a DC coefficient of −4 is then 101 011. Thus six bits are required to represent this value.

By way of further example, a coefficient value of −1 would be represented by a bit pattern of 00 0, requiring only three bits. A coefficient value of 129 would be represented by a bit pattern of 1111110 10000001, requiring 15 bits. Because the DC coefficients tend to be small, most require only a small number of bits for representation, resulting in efficient storage of the DC coefficients in an image.

The JPEG specification provides for generating Table 2 algorithmically from a list of the number of codes of each size to be generated and an ordering of the categories represented by the codes. The list of the number of codes of each size is an array of 16 numbers, and the ordering is an array containing as many numbers as the total of the entries in the first list. The arrays needed to generate Table 2 are:

Code length counts: 0, 2, 3, 1, 1, 1, 1, 0, 0, 0, 0, 0, 0, 0, 0, 0

Ordering values: 1, 2, 0, 3, 4, 5, 6, 7, 8

Specifying these arrays to the JPEG circuitry or other engine in a camera or system serves to "configure" the circuitry or engine. The arrays may be specified for each image, and are stored in the resulting file with the image data so that the data may be reconstructed. The JPEG technique allows the arrays to be specified for each image so that the Huffman codes may be optimized for maximum compression if the programmer so desires. A computer program for generating the code tables from the arrays is given in Appendix A.

A table similar to Table 2 may be constructed for the chrominance channel DC coefficients of the image, using uses different generating values, and resulting in different Huffman codes for the values.

Coding of the AC coefficients is done differently than the DC coefficients. JPEG and MPEG also code the AC coefficients differently from each other. JPEG AC coding is discussed first below.

In a JPEG file, Huffman codes are assigned not just to the size range of the AC coefficient, but a combination of the coefficient size range and the number of zero coefficients preceding the non-zero coefficient. For example, a coefficient may have a value of 9 and follow a run of 3 zeros. This coefficient is said to have a run/size combination of 3/4. A coefficient with a value of −1 and following another non-zero coefficient would have a run/size combination of 0/1.

Each run/size combination is assigned a Huffman code. Each non-zero AC coefficient is represented in the resulting JPEG file by its proper Huffman code (indicating the number of zero coefficients preceding the non-zero coefficient and the relative size of the non-zero coefficient) and a set of following bits that specify the exact value of the coefficient. The following bits for the AC coefficients are as described for the DC coefficient in Tables 2 and 3.

A typical JPEG table for coding AC coefficients (analogous to Table 2 above for coding DC coefficients) is abbreviated below:

TABLE 4

| Run/size | Code | |
|---|---|---|
| 0/0 | 1010 | (Special end-of-block character) |
| 0/1 | 00 | |
| 0/2 | 01 | |
| 0/3 | 100 | |
| 0/4 | 1011 | |
| 0/5 | 11010 | |
| . | | |
| . | | |
| 1/1 | 1100 | |
| 1/2 | 11011 | |
| 1/3 | 1111011 | |
| . | | |
| . | | |
| 2/1 | 11100 | |
| 2/2 | 11111001 | |
| . | | |
| . | | |
| 3/1 | 111010 | |
| 3/2 | 111110111 | |
| . | | |
| . | | |

Combining tables 1, 2, 3, and 4 above, it is now possible to determine the JPEG bit pattern for the luminance values of the entire example pixel block:

TABLE 5

(JPEG)

| Coefficient Number | Run/size | Value | Bit pattern |
|---|---|---|---|
| 0 (DC) | N/A | −4 | 101 011 |
| 1 | 0/3 | −5 | 100 010 |
| 2 | 0/3 | −4 | 100 011 |
| 3 | 0/1 | 1 | 00 1 |
| 4 | 0/1 | 1 | 00 1 |
| 5 | 0/2 | 2 | 01 10 |
| 9 | 3/1 | −1 | 111010 0 |
| End of Block | | | 1010 |

The JPEG specification provides for generating Table 4 algorithmically from a list of the number of codes of each size to be generated and an ordering of the categories represented by the codes, in the same way that Table 2 can be generated.

The arrays needed to generate Table 4 are:

Code length counts: 0, 2, 1, 3, 3, 2, 4, 3, 5, 5, 4, 4, 0, 0, 1, 125

Ordering values (in hexadecimal notation):
01, 02, 03, 00, 04, 11, 05, 12, 21, 31, 41, 06, 13, 51, 61, 07 22, 71, 14, 32, 81, 91, A1, 08, 23, 42, B1, C1, 15, 52, D1, F0 24, 33, 62, 72, 82, 09, 0A, 16, 17, 18, 19, 1A, 25, 26, 27, 28 29, 2A, 34, 35, 36, 37, 38, 39, 3A, 42, 44, 45, 46, 47, 48, 49 4A, 53, 54, 55, 56, 57, 58, 59, 5A, 63, 64, 65, 66, 67, 68, 69 6A, 73, 74, 75, 76, 77, 78, 79, 7A, 83, 84, 85, 86, 87, 88, 89 8A, 92, 93, 94, 95, 96, 97, 98, 99, 9A, A2, A3, A4, A5, A6, A7 A8, A9, AA, B2, B3, B4, B5, B6, B7, B8, B9, BA, C2, C3, C4, C5 C6, C7, C8, C9, CA, D2, D3, D4, D5, D6, D7, D8, D9, DA, E1, E2 E3, E4, E5, E6, E7, E8, E9, EA, F1, F2, F3, F4, F5, F6, F7, F8 F9, FA In the above array of ordering values, the first hex digit in each entry indicates the run of zeros encoded by a particular Huffman code, and the second digit indicates the size (number of bits in) a number following the Huffman code for specifying the actual value of the coefficient. For example, a run of three zeros followed by a coefficient value of 1 (a run/size combination of 3/1 in Table 4) is represented by the hexadecimal value 31 in the above array.

A table similar to Table 4 may be constructed for the chrominance channel AC coefficients of the image, using different generating values, and resulting in different Huffman codes for the run/size combinations.

MPEG encodes the AC coefficients differently. Rather than assign Huffman codes to run/size combinations, MPEG assigns Huffman codes to common run/value combinations. That is, common combinations of the number of zeros preceding a non-zero coefficient and the actual value of the coefficient (not just its relative size) are assigned Huffman codes. There are a very large number of possible run/value combinations, so only the most common few dozen are assigned Huffman codes. A special escape sequence handles the occasional combination that is not in the default table.

The table of MPEG Huffman codes for various run/value combinations is abbreviated below:

TABLE 6

| Run/value | Code |
|---|---|
| 0/1 | 11 s |
| 0/2 | 0100 s |
| 0/3 | 00101 s |
| 0/4 | 0000110 s |
| 0/5 | 00100110 s |
| 0/6 | 00100001 s |
| . | |
| . | |
| 1/1 | 011 s |
| 1/2 | 000110 s |
| 1/3 | 00100101 s |
| . | |
| . | |
| 2/1 | 0101 s |
| 2/2 | 0000100 s |
| . | |
| . | |

TABLE 6-continued

| Run/value | Code |
|---|---|
| 3/1 | 00111 s |
| 3/2 | 00100100 s |
| . | |
| . | |
| . | |
| End of block | 10 |

The last bit of each code, indicated by "s", is a sign bit, with 0 indicating a positive value and 1 indicating a negative value.

Combining tables 1, 2, and 6 above, it is now possible to determine the MPEG bit pattern for the luminance values of the entire example pixel block:

TABLE 7

(MPEG)

| Coefficient Number | Run/size | Value | Bit pattern |
|---|---|---|---|
| 0 (DC) | N/A | −4 | 101 011 |
| 1 | 0 | −5 | 001001101 |
| 2 | 0 | −4 | 00001101 |
| 3 | 0 | 1 | 110 |
| 4 | 0 | 1 | 110 |
| 5 | 0 | 2 | 01000 |
| 9 | 3 | −1 | 001111 |
| End of Block | | | 10 |

Clearly there is much commonality between making a JPEG image and making an MPEG I-frame. It is possible to create MPEG I-frames by creating JPEG images using dedicated circuitry in a camera, parsing the Huffman stream, and substituting the corresponding MPEG bit patterns. However, because the Huffman codes representing different DCT coefficients typically vary in length, the process of parsing the stream may be time consuming and inefficient when performed by a camera's microprocessor.

The dedicated JPEG circuitry or other engine in a camera typically does not allow the compression process to be interrupted before the Huffman coding of the AC coefficients so that a different coding method could be used for construction MPEG I-frames.

MPEG compression may be done without the aid of compression circuitry by a program running on a microprocessor that is part of a camera, but this method may be so time consuming that the camera user is dissatisfied. Dedicated circuitry could perform the MPEG compression quickly, but many cameras do not contain circuitry for constructing MPEG sequences, and such circuitry may be expensive.

There is a need for a method of using the JPEG circuitry or other engine in a camera or other imaging device to assist in the construction of an MPEG sequence by performing the processing steps common to both JPEG and MPEG, while allowing the remaining processing to be performed efficiently.

SUMMARY OF THE INVENTION

A camera or other imaging device or other system configures its JPEG engine to produce a JPEG image that is in compliance with the JPEG specification but specially constructed. The configuration is chosen such that the JPEG image information for pixels of an image is stored in 8- or 16-bit groups, unlike a typical JPEG image in which image information is stored in groups of varying numbers of bits. A final software step reads the JPEG image information and constructs an equivalent MPEG I-frame. The 8- and 16-bit grouping in the JPEG image facilitates efficient conversion from JPEG to MPEG.

DETAILED DESCRIPTION OF THE PREFERRED EMBODIMENT

Figure 1:
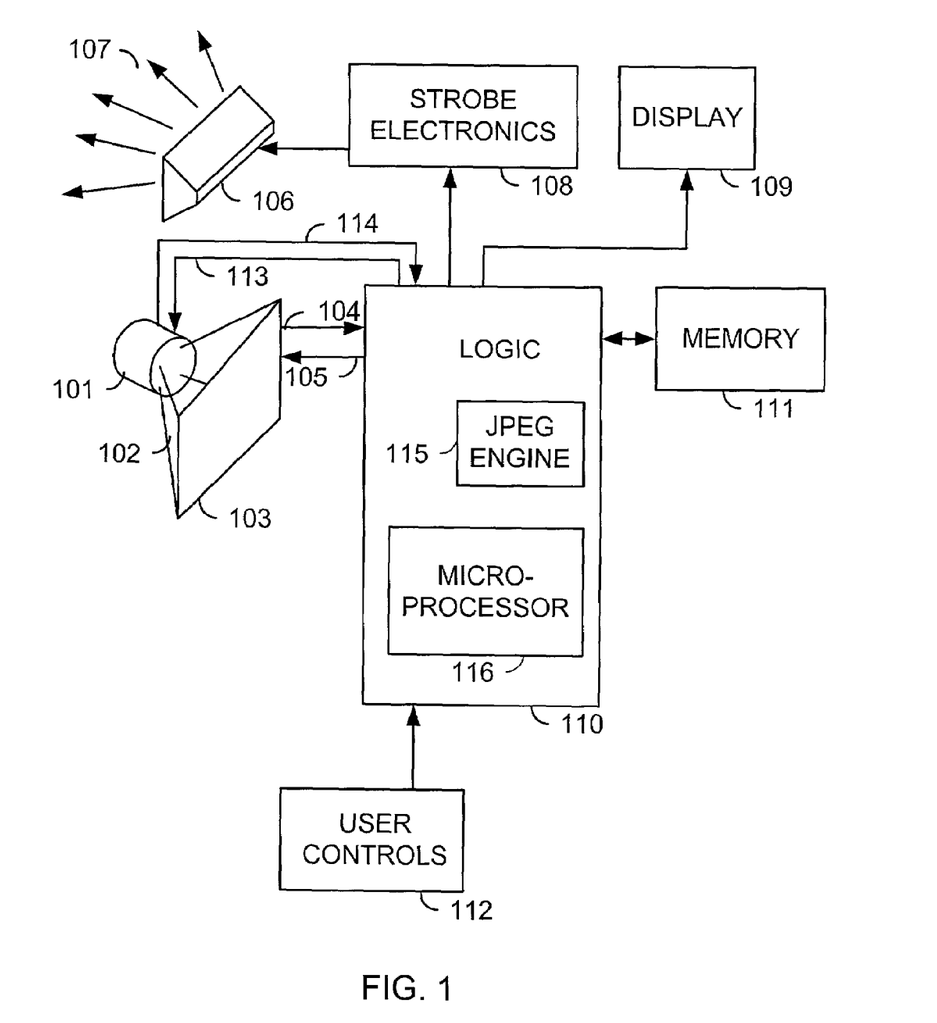
FIG. 1 is a block diagram of a digital camera.

FIG. 1 shows a block diagram of a digital camera. The lens (101) gathers light from a scene (not shown). The gathered light is redirected (102) to form an image of the scene on an electronic array light sensor (103). The operation of a focusing mechanism, which may include all or part of the lens (101), may be controlled by control signals (113) from a logic unit (110), which may contain a microprocessor system (116). Feedback signals (114) indicating the position of the focusing mechanism may flow from the lens (101) to the logic unit (110). A flash, or strobe (106) may be utilized to supply additional light (107) to the scene. The strobe is operated by the strobe electronics (108), which in turn are controlled by the logic unit (110). The camera may comprise a display (109) on which image data or status information may be shown. The camera may comprise a memory (111) for storage and recall of image data, as well as data interchange with other devices (not shown).

The operation of the electronic array light sensor (103) may be controlled by control signals (105) from logic unit (110), and image information signals (104) flow from the sensor to the logic unit (110).

Logic unit (110) may also include dedicated circuitry (115) for performing JPEG image compression.

The user of the camera may operate various control inputs (112) in order to affect the operation of the camera. The camera may also comprise other controls and features that are omitted here for clarity.

Tables 2 and 4 used in the example above are example tables chosen to provide good compression of photographic data. The JPEG specification allows a programmer to specify these tables for each image being compressed. This configurability is provided so that a programmer may select different Huffman codes to optimally compress data with particular statistical characteristics. In an example embodiment of the present invention, different tables are specified, but not for the usual purpose of optimal compression. The configurability of the compression engine is exploited for a different purpose than for which it was intended.

For encoding the DC coefficient of each data block, the following table (analogous to Table 2) is used:

TABLE 8

| Y code | size | magnitude range |
|---|---|---|
| 0 | 7 | −127 . . . −64, 64 . . . 127 |
| 10 | 6 | −63 . . . −32, 32 . . . 63 |
| 110 | 5 | −31 . . . −16, 16 . . . 31 |
| 1110 | 4 | −15 . . . −8, 8 . . . 15 |
| 11110 | 3 | −7 . . . −4, 4 . . . 7 |
| 111110 | 2 | −3 . . . −2, 2 . . . 3 |
| 1111110 | 1 | −1, 1 |
| 11111110 | 0 | 0 |
| 11111111 | 8 | −255 . . . −128, 128 . . . 255 |

Using this table of Huffman codes allows any DC coefficient between −255 and 255 to be represented with an 8- or 16-bit pattern. For example, a DC coefficient of −4, as in the above example block, is represented by the 8-bit pattern 11110 011. A DC coefficient of −1 would be represented by the 8-bit pattern 1111110 0, and a DC coefficient of 129 would be represented by the 16-bit pattern 11111111 10000001.

The arrays needed to generate Table 8 algorithmically according to the JPEG specification are:

Code length counts: 1, 1, 1, 1, 1, 1, 1, 2, 0, 0, 0, 0, 0, 0, 0, 0

Ordering values: 0, 1, 2, 3, 4, 5, 6, 7, 8

A similar table (analogous to table 4) may be generated for coding the AC coefficients, and is used in an embodiment of the present invention. An abbreviated version is:

TABLE 9

| Run/size | Code | |
|---|---|---|
| 0/0 | 0001111111100000 | (Special end-of-block character) |
| 0/1 | 000111111100000 | |
| 0/2 | 00011111100000 | |
| 0/3 | 0001111100000 | |
| 0/4 | 000111100000 | |
| 0/5 | 00011100000 | |
| . | . | |
| 1/1 | 000111111100001 | |
| 1/2 | 00011111100001 | |
| 1/3 | 0001111100001 | |
| . | . | |
| 2/1 | 000111111100010 | |
| 2/2 | 00011111100010 | |
| . | . | |
| 3/1 | 000111111100011 | |
| 3/2 | 00011111100011 | |
| . | . | |
| . | . | |

Each entry in table 9 has the property that the length of the Huffman code and the length of the following bits combine to a 16-bit value to represent any particular run/value combination.

Combining tables 1, 2, 3, and 9 above, it is now possible to determine the JPEG bit pattern for the luminance values of the entire example pixel block, constructed in accordance with an example embodiment of the invention:

TABLE 10

(Special JPEG)

| Coefficient Number | Run/size | Value | Bit pattern |
|---|---|---|---|
| 0 (DC) | N/A | −4 | 11110 011 |
| 1 | 0/3 | −5 | 0001111100000 010 |
| 2 | 0/3 | −4 | 0001111100000 011 |
| 3 | 0/1 | 1 | 000111111100001 1 |
| 4 | 0/1 | 1 | 000111111100001 1 |
| 5 | 0/2 | 2 | 00011111100000 10 |
| 9 | 3/1 | −1 | 000111111100011 0 |
| End of Block | | | 0001111111100000 |

The arrays needed to generate Table 9 are:

Code length counts: 0, 0, 0, 0, 0, 0, 0, 16,16,16,16,16,16, 16,16, 2

Ordering values (in hexadecimal notation):
08, 18, 28, 38, 48, 58, 68, 78, 88, 98, A8, B8, C8, D8, E8, F8 07, 17, 27, 37, 47, 57, 67, 77, 87, 97, A7, B7, C7, D7, E7, F7 06, 16, 26, 36, 46, 56, 66, 76, 86, 96, A6, B6, C6, D6, E6, F6 05, 15, 25, 35, 45, 55, 65, 75, 85, 95, A5, B5, C5, D5, E5, F5 04, 14, 24, 34, 44, 54, 64, 74, 84, 94, A4, B4, C4, D4, E4, F4 03, 13, 23, 33, 43, 53, 63, 73, 83, 93, A3, B3, C3, D3, E3, F3 02, 12, 22, 32, 42, 52, 62, 72, 82, 92, A2, B2, C2, D2, E2, F2 01, 11, 21, 31, 41, 51, 61, 71, 81, 91, A1, B1, C1, D1, E1, F1 00, F0

A JPEG file constructed in accordance with an example embodiment of the invention and exemplified in Table 10 has the feature that all bit patterns encoding coefficients are 8 or 16 bits in length. The data are said to be "byte-aligned". These lengths match with the usual structure of computer memory and microprocessor architectures such that a microprocessor may read the contents of the file very quickly without the need to do bit-level manipulation of data to extract codes of varying length as would be necessary with a typical JPEG file as exemplified in Table 5.

Tables can be constructed to convert a byte-aligned JPEG file to an MPEG file. For example, Tables 2 and 8 above may be combined as follows:

TABLE 11

| DC Byte code | Coefficient value represented | Equivalent MPEG Code | MPEG code length |
|---|---|---|---|
| 0 0000000 | −127 | 111110 0000000 | 13 |
| 0 0000001 | −126 | 111110 0000001 | 13 |
| 0 0000010 | −125 | 111110 0000010 | 13 |
| . . . | | | |
| 0 1111111 | 127 | 111110 1111111 | 13 |
| 10 000000 | −63 | 11110 000000 | 11 |
| 10 000001 | −62 | 11110 000001 | 11 |
| . . . | | | |
| 10 111111 | 63 | 11110 111111 | 11 |
| 110 00000 | −31 | 1110 00000 | 9 |
| 110 00001 | −30 | 1110 00001 | 9 |
| . . . | | | |
| 110 11111 | 31 | 1110 11111 | 9 |
| 1110 0000 | −15 | 110 0000 | 7 |
| 1110 0001 | −14 | 110 0001 | 7 |
| . . . | | | |
| 1110 1111 | 15 | 110 1111 | 7 |
| 11110 000 | −7 | 101 000 | 6 |
| 11110 001 | −6 | 101 001 | 6 |

TABLE 11-continued

| DC Byte code | Coefficient value represented | Equivalent MPEG Code | MPEG code length |
|---|---|---|---|
| ... | | | |
| 11110 111 | 7 | 101 111 | 6 |
| 111110 00 | −3 | 01 00 | 4 |
| 111110 01 | −2 | 01 01 | 4 |
| 111110 10 | 2 | 01 10 | 4 |
| 111110 11 | 3 | 01 11 | 4 |
| 1111110 0 | −1 | 00 0 | 3 |
| 1111110 1 | 1 | 00 1 | 3 |
| 11111110 | 0 | 100 | 3 |
| 11111111 00000000 | −255 | 1111110 00000000 | 15 |
| 11111111 00000001 | −254 | 1111110 00000001 | 15 |
| ... | | | |
| 11111111 01111111 | −128 | 1111110 01111111 | 15 |
| 11111111 10000000 | 128 | 1111110 10000000 | 15 |
| 11111111 10000001 | 129 | 1111110 10000001 | 15 |
| ... | | | |
| 11111111 11111110 | 254 | 1111110 11111110 | 15 |
| 11111111 11111111 | 255 | 1111110 11111111 | 15 |

Using a table look-up method, a program running on a camera's microprocessor system can rapidly convert each specially coded DC JPEG coefficient code to an MPEG DC coefficient code, which may be placed in a destination MPEG image file. A table similar to Table 11 may be constructed for the chrominance channels of the image.

Similarly, Tables 2, 6, and 9 may be combined to form a table analogous to Table 11, but for the AC luminance coefficients. An abbreviated sample is as follows:

TABLE 12

| Run/size | AC Code with extra bits | Run/value Represented | Equivalent MPEG Code | MPEG Code Length |
|---|---|---|---|---|
| 0/4 | 000111100000 0000 | 0/−15 | 0000 0000 1011 11 | 14 |
| ... | | | | |
| 0/3 | 0001111100000 000 | 0/−7 | 0000 0010 101 | 11 |
| 0/3 | 0001111100000 001 | 0/−6 | 0010 0001 1 | 9 |
| 0/3 | 0001111100000 110 | 0/6 | 0010 0001 0 | 9 |
| ... | | | | |
| 0/3 | 0001111100000 111 | 0/7 | 0000 0010 100 | 11 |
| 1/3 | 0001111100001 000 | 1/−7 | 0000 0000 1010 11 | 14 |
| 1/3 | 0001111100001 001 | 1/−6 | 0000 0000 1011 01 | 14 |
| 1/3 | 0001111100001 110 | 1/6 | 0000 0000 1011 00 | 14 |
| ... | | | | |
| 1/3 | 0001111100001 111 | 1/7 | 0000 0000 1010 10 | 14 |
| ... | | | | |
| 0/2 | 00011111100000 00 | 0/−3 | 0010 11 | 6 |
| 0/2 | 00011111100000 01 | 0/−2 | 0100 1 | 5 |
| 0/2 | 00011111100000 10 | 0/2 | 0100 0 | 5 |
| 0/2 | 00011111100000 11 | 0/3 | 0010 10 | 6 |
| 1/2 | 00011111100001 00 | 1/−3 | 0010 0101 1 | 9 |
| 1/2 | 00011111100001 01 | 1/−2 | 0001 101 | 7 |
| 1/2 | 00011111100001 10 | 1/2 | 0001 100 | 7 |
| 1/2 | 00011111100001 11 | 1/3 | 0010 0101 0 | 9 |
| 2/2 | 00011111100010 00 | 2/−3 | 0000 0010 111 | 11 |
| 2/2 | 00011111100010 01 | 2/−2 | 0000 1001 | 8 |
| 2/2 | 00011111100010 10 | 2/2 | 0000 1000 | 8 |
| 2/2 | 00011111100010 11 | 2/3 | 0000 0010 110 | 11 |
| 3/2 | 00011111100011 00 | 3/−3 | 0000 0001 1100 1 | 13 |
| 3/2 | 00011111100011 01 | 3/−2 | 0010 0100 1 | 9 |
| ... | | | | |
| 0/1 | 000111111100000 0 | 0/−1 | 111 | 3 |
| 0/1 | 000111111100000 1 | 0/1 | 110 | 3 |
| 1/1 | 000111111100001 0 | 1/−1 | 0111 | 4 |
| 1/1 | 000111111100001 1 | 1/1 | 0110 | 4 |
| 2/1 | 000111111100010 0 | 2/−1 | 0101 1 | 5 |
| 2/1 | 000111111100010 1 | 2/1 | 0101 0 | 5 |
| 3/1 | 000111111100011 0 | 3/−1 | 0011 11 | 6 |

TABLE 12-continued

| Run/size | AC Code with extra bits | Run/value Represented | Equivalent MPEG Code | MPEG Code Length |
|---|---|---|---|---|
| 3/1 | 000111111100011 1 | 3/1 | 0011 10 | 6 |
| 0/0 | 0001111111100000 | EOB | 10 | 2 |

Using a table look-up method, a program running on a camera's microprocessor system (116) may rapidly convert each specially coded AC JPEG coefficient code to an MPEG AC coefficient code, which may be placed in a destination MPEG image file.

The program may also supply the proper header information to the file.

Figure 2:
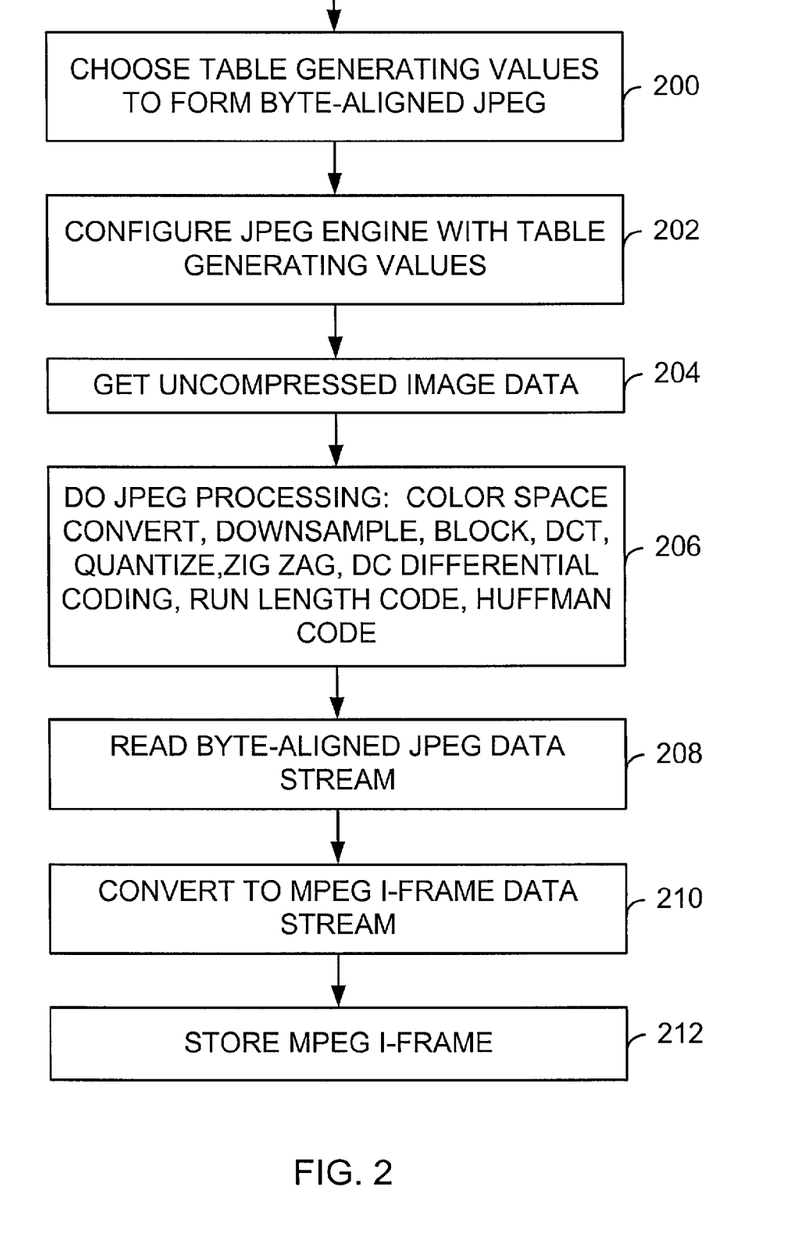
FIG. 2 is a flow diagram showing the steps used to implement an embodiment of the invention.

FIG. 2 is a flow diagram showing the steps used to implement an embodiment of the invention. In step 200, table generating values are chosen that will generate Huffman code tables, such as Tables 8 and 9 above, having the property that the Huffman codes for each run/size combination and the additional bits to fully specify the value of each coefficient combine to form a code that is exactly 8 or 16 bits long.

In step 202, the table generating values are provided to the JPEG engine to be used in performing JPEG processing. This configures the JPEG engine.

In step 204, an uncompressed image is obtained. The image may be obtained by taking a photograph with a digital camera, making an image with some other imaging device such as a scanner, or even reading a previously stored digital file.

In step 206, the JPEG engine performs the JPEG processing, generating the code tables from the table generating values supplied earlier and performing the steps of the JPEG technique. This creates a "byte-aligned" JPEG data stream.

In step 208, the byte-aligned JPEG data stream is read by a program running on a processor.

In step 210, the byte-aligned data stream is efficiently converted by a simple table lookup or similar means to an MPEG data stream.

In step 212, the MPEG data stream is stored as an MPEG I-frame. This step may also include adding header information to the file.

The foregoing description of the present invention has been presented for purposes of illustration and description. It is not intended to be exhaustive or to limit the invention to the precise form disclosed, and other modifications and variations may be possible in light of the above teachings. For example, the invention may be used to take advantage of existing JPEG software code libraries for aiding in the construction of MPEG I-frames. No hardware need be involved at all; the JPEG engine may be entirely software based. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

APPENDIX A – PROGRAM TO GENERATE HUFFMAN TABLES

```
10   ! RE-STORE "JPEG_PAT"
20     REM ******************************************************
30     REM
40     REM    This is a program to generate Huffman code
50     REM  tables for JPEG compression.  Example tables are
60     REM  generated for common JPEG DC and AC generating
70     REM  values, as well as tables for special byte-aligned
80     REM  JPEG files.
90     REM
100    REM    These correspond to Tables 2, 4, 8, and 9
110    REM  in the patent application specification.
120    REM
130    REM    HP Docket PDNO 100110176
140    REM    November 2001
150    REM
160    REM ---------------------------------------------------------
170    REM
180    ALLOCATE Huff_val(255),Huff_bits(15),Huff_size(255)
190    ALLOCATE Huff_code(255),B$[50],Title$[50]
200  ! PRINTER IS "OUTFILE.TXT"
210    PRINTER IS 1
220    REM
230    REM  Generate all four tables
240    REM
250    FOR Table_count=1 TO 4
260       REM
270       REM   Point to correct data
280       REM
290       SELECT Table_count
300       CASE 1
310          RESTORE Table2_data
320          Nval=9
330          Title$="Table 2."
340       CASE 2
350          RESTORE Table4_data
360          Nval=162
370          Title$="Table 4."
380       CASE 3
390          RESTORE Table8_data
400          Nval=9
410          Title$="Table 8."
420       CASE 4
430          RESTORE Table9_data
440          Nval=130
450          Title$="Table 9."
460       END SELECT
470       REM
480       REM   Read table generating values
490       REM
500       FOR I=0 TO Nval-1
510          READ A$
520          Huff_val(I)=DVAL(A$,16)
530       NEXT I
540       READ Huff_bits(*)
550       REM
560       REM   Generate the HUFFSIZE table
570       REM
```

```
580        K=0
590        I=1
600        J=1
610        WHILE (I<=16)
620           WHILE (J<=Huff_bits(I-1))
630              Huff_size(K)=I
640              K=K+1
650              J=J+1
660           END WHILE
670           I=I+1
680           J=1
690        END WHILE
700        Lastk=K
710        Huff_size(K)=0
720        REM
730        REM    Generate the HUFFCODE table
740        REM
750        K=0
760        Size=Huff_size(0)
770        Code=0
780        Flag=0
790        WHILE Flag=0
800           REPEAT
810              Huff_code(K)=Code
820              Code=Code+1
830              K=K+1
840           UNTIL Huff_size(K)<>Size
850           IF Huff_size(K)=0 THEN
860              Flag=1
870              GOTO Skipit! Equivalent of "break" in C
880           END IF
890           REPEAT
900              Code=Code*2
910              Size=Size+1
920           UNTIL Huff_size(K)=Size
930 Skipit: REM
940        END WHILE
950        REM
960        REM    Sort table, format, and print
970        REM
980        CALL Sortem(Lastk,Huff_val(*),Huff_code(*),Huff_size(*))
990        PRINT RPT$(" ",15);Title$
1000       PRINT
1010       FOR K=0 TO Lastk-1
1020          A$=DVAL$(Huff_val(K),16)
1030          A$=A$[7]
1040          B$=DVAL$(Huff_code(K),2)
1050          B$=B$[32-Huff_size(K)+1]
1060          PRINT USING "4D,2X,6A,20A,6D";K,A$,B$,Huff_size(K)
1070       NEXT K
1080       PRINT
1090    NEXT Table_count
1100    STOP
1110    REM
1120    REM    Data sets for generating tables follow
1130    REM
1140 Table2_data: REM
1150    DATA 01,02,00,03,04,05,06,07,08
1160    DATA 00,02,03,01,01,01,01,00,00,00,00,00,00,00,00,00
1170 Table4_data: REM
```

```
1180    DATA 01,02,03,00,04,11,05,12,21,31,41,06,13,51,61,07
1190    DATA 22,71,14,32,81,91,A1,08,23,42,B1,C1,15,52,D1,F0
1200    DATA 24,33,62,72,82,09,0A,16,17,18,19,1A,25,26,27,28
1210    DATA 29,2A,34,35,36,37,38,39,3A,43,44,45,46,47,48,49
1220    DATA 4A,53,54,55,56,57,58,59,5A,63,64,65,66,67,68,69
1230    DATA 6A,73,74,75,76,77,78,79,7A,83,84,85,86,87,88,89
1240    DATA 8A,92,93,94,95,96,97,98,99,9A,A2,A3,A4,A5,A6,A7
1250    DATA A8,A9,AA,B2,B3,B4,B5,B6,B7,B8,B9,BA,C2,C3,C4,C5
1260    DATA C6,C7,C8,C9,CA,D2,D3,D4,D5,D6,D7,D8,D9,DA,E1,E2
1270    DATA E3,E4,E5,E6,E7,E8,E9,EA,F1,F2,F3,F4,F5,F6,F7,F8
1280    DATA F9,FA
1290    DATA 00,02,01,03,03,02,04,03,05,05,04,04,00,00,01,125
1300 Table8_data: REM
1310    DATA 00,01,02,03,04,05,06,07,08
1320    DATA 01,01,01,01,01,01,01,02,00,00,00,00,00,00,00,00
1330 Table9_data: REM
1340    DATA 08,18,28,38,48,58,68,78,88,98,A8,B8,C8,D8,E8,F8
1350    DATA 07,17,27,37,47,57,67,77,87,97,A7,B7,C7,D7,E7,F7
1360    DATA 06,16,26,36,46,56,66,76,86,96,A6,B6,C6,D6,E6,F6
1370    DATA 05,15,25,35,45,55,65,75,85,95,A5,B5,C5,D5,E5,F5
1380    DATA 04,14,24,34,44,54,64,74,84,94,A4,B4,C4,D4,E4,F4
1390    DATA 03,13,23,33,43,53,63,73,83,93,A3,B3,C3,D3,E3,F3
1400    DATA 02,12,22,32,42,52,62,72,82,93,A2,B2,C2,D2,E2,F2
1410    DATA 01,11,21,31,41,51,61,71,81,91,A1,B1,C1,D1,E1,F1
1420    DATA 00,F0
1430    DATA 00,00,00,00,00,00,00,16,16,16,16,16,16,16,16,02
1440    END
1450    SUB Sortem(N,A(*),B(*),C(*))
1460 Sortem: REM
1470       REM ******************************************************
1480       REM
1490       REM    Simple bubblesort routine to sort the arrays
1500       REM    based on A(*).
1510       REM
1520       REM -----------------------------------------------------
1530       REM
1540       FOR I=N-1 TO 1 STEP -1
1550          FOR J=1 TO I
1560             IF A(J)<A(J-1) THEN
1570                T=A(J)
1580                A(J)=A(J-1)
1590                A(J-1)=T
1600                T=B(J)
1610                B(J)=B(J-1)
1620                B(J-1)=T
1630                T=C(J)
1640                C(J)=C(J-1)
1650                C(J-1)=T
1660             END IF
1670          NEXT J
1680       NEXT I
1690    SUBEND
```

What is claimed is:

1. A method for constructing MPEG I-frames comprising the steps of;
   a) configuring a JPEG engine to produce JPEG data in which all discrete cosine transform coefficients are encoded in a byte-aligned manner; and
   b) performing JPEG processing, using the JPEG engine, on an uncompressed digital image of a scene, producing JPEG data in which the discrete cosine transform coefficients are encoded in a byte-aligned manner; and
   c) reading the JPEG data;
   d) converting the JPEG data to MPEG data; and
   e) constructing an MPEG I-frame comprising the MPEG data.

2. The method of claim 1 farther comprising the step of storing the MPEG data in an MPEG file.

3. The method of claim 2, further comprising the step of adding file header information to the MPEG file.

4. The method of claim 1 wherein the step of configuring the JPEG engine is accomplished by specifying table generating values that are used by the JPEG engine to generate Huffman code tables.

5. The method of claim 1, further comprising the steps of:
   a) providing conversion tables for converting JPEG data in which discrete cosine transform coefficients are encoded in a byte-aligned manner to MPEG data; and
   b) performing the step of converting the JPEG data to MPEG data using the conversion tables.

6. A digital imaging device comprising:
   a) a lens for focusing light; and
   b) an electronic array light sensor for receiving the focused light from the lens; and
   c) a logic unit for controlling the digital imaging device and receiving image information from the electronic array light sensor, the logic unit comprising a microprocessor system and a JPEG engine, the logic unit adapted to
      i. configure the JPEG engine to produce a data stream in which discrete cosine transform coefficients are encoded in a byte-aligned manner; and
      ii. convert the data stream to an MPEG data stream representing an MPEG I-frame.

7. The digital imaging device of claim 6 wherein the digital imaging device is a camera.

8. An image compression system comprising:
   a) means for obtaining an uncompressed digital image; and
   b) means for performing JPEG image processing; and
   c) means for configuring the JPEG processing means to produce a JPEG-compliant data stream in which all discrete cosine transform coefficients are encoded in a byte-aligned manner; and
   d) means for converting the data stream to a data stream representing an MPEG I-frame.

* * * * *

UNITED STATES PATENT AND TRADEMARK OFFICE
CERTIFICATE OF CORRECTION

PATENT NO.        : 7,149,360 B2
APPLICATION NO. : 10/043950
DATED             : December 12, 2006
INVENTOR(S)       : Wilfred F Brake et al.

It is certified that error appears in the above-identified patent and that said Letters Patent is hereby corrected as shown below:

In column 6, line 10, below "110" insert -- 111 --.

In column 6, line 10, below "6" insert -- 7 --.

In column 21, line 3, in Claim 1, delete "of;" and insert -- of: --, therefor.

In column 21, line 15, in Claim 2, delete "claim 1 farther" and insert -- claim 1, further --, therefor.

Signed and Sealed this

Fifth Day of May, 2009

JOHN DOLL
*Acting Director of the United States Patent and Trademark Office*